(12) United States Patent
Yoshimoto (10) Patent No.: US 9,170,427 B2
(45) Date of Patent: Oct. 27, 2015

(54) STEREOSCOPIC ELECTRO-OPTICAL DEVICE AND ELECTRONIC APPARATUS WITH CROSS-TALK CORRECTION

(75) Inventor: Hiroshi Yoshimoto, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 720 days.

(21) Appl. No.: 13/359,342

(22) Filed: Jan. 26, 2012

(65) Prior Publication Data

US 2012/0194659 A1 Aug. 2, 2012

(30) Foreign Application Priority Data

Jan. 27, 2011 (JP) ................. 2011-015675

(51) Int. Cl.
*H04N 13/04* (2006.01)
*G02B 27/22* (2006.01)
*H04N 13/00* (2006.01)

(52) U.S. Cl.
CPC ........ *G02B 27/2228* (2013.01); *G02B 27/2264* (2013.01); *H04N 13/0018* (2013.01); *H04N 13/0033* (2013.01); *H04N 13/0438* (2013.01); *H04N 13/0497* (2013.01)

(58) Field of Classification Search
CPC .......... H04N 13/0033; H04N 13/0438; H04N 13/0018; H04N 13/0497; H04N 13/0429; G02B 27/2228; G02B 27/2264
USPC ..................................................... 348/51, 56
See application file for complete search history.

(56) References Cited

U.S. PATENT DOCUMENTS

| | | | |
|---|---|---|---|
| 7,796,291 B2 | 9/2010 | Hosaka et al. | |
| 8,363,096 B1 * | 1/2013 | Aguirre | 348/57 |
| 8,605,138 B2 * | 12/2013 | Son et al. | 348/51 |
| 8,704,883 B2 * | 4/2014 | Lee et al. | 348/56 |
| 2009/0109247 A1 * | 4/2009 | Kimura | 345/690 |
| 2010/0225750 A1 | 9/2010 | Nakahata et al. | |
| 2010/0309381 A1 * | 12/2010 | Nakagawa et al. | 348/705 |
| 2011/0090321 A1 * | 4/2011 | Nakagawa et al. | 348/51 |
| 2011/0122237 A1 * | 5/2011 | Hong | 348/56 |
| 2011/0261029 A1 * | 10/2011 | Moon et al. | 345/204 |
| 2011/0261054 A1 * | 10/2011 | Sato | 345/419 |
| 2011/0273439 A1 * | 11/2011 | Son et al. | 345/419 |
| 2011/0292185 A1 * | 12/2011 | Takenaka | 348/51 |
| 2011/0304709 A1 * | 12/2011 | Umeda et al. | 348/51 |
| 2012/0075289 A1 * | 3/2012 | Koh et al. | 345/419 |
| 2012/0169720 A1 * | 7/2012 | Moh et al. | 345/419 |
| 2013/0038704 A1 * | 2/2013 | Hirata et al. | 348/51 |

FOREIGN PATENT DOCUMENTS

| | | |
|---|---|---|
| CN | 1864089 A | 11/2006 |
| CN | 101794026 A | 8/2010 |

(Continued)

*Primary Examiner* — David Harvey
(74) *Attorney, Agent, or Firm* — Maschoff Brennan (57) ABSTRACT

A display control circuit includes: a frame memory; a first correction image data generation unit that generates first correction image data that corrects a response characteristic of an electro-optical element; a second correction image data generation unit that generates second correction image data that corrects the intermixing of a right-eye image and a left-eye image; a selection unit that selects the first correction image data in a first field and the second correction image data in a second and subsequent fields; and a correction unit that generates output image data by correcting the first image data.

16 Claims, 8 Drawing Sheets

(56) References Cited

FOREIGN PATENT DOCUMENTS

| | | |
|---|---|---|
| CN | 101827279 A | 9/2010 |
| JP | 2001-054143 A | 2/2001 |
| JP | 2007-108243 A | 4/2007 |
| JP | 2007-108245 A | 4/2007 |
| JP | 2007-199418 A | 8/2007 |
| JP | 2009-025436 A | 2/2009 |
| WO | 2005/033776 A1 | 4/2005 |

* cited by examiner

STEREOSCOPIC ELECTRO-OPTICAL DEVICE AND ELECTRONIC APPARATUS WITH CROSS-TALK CORRECTION

BACKGROUND

1. Technical Field

The present invention relates to techniques for displaying right-eye images and left-eye images that have been made disparate from each other so that a viewer senses a stereoscopic image.

2. Related Art

In the past, a frame-sequential stereoscopic scheme that displays right-eye images and left-eye images alternately through time division has been proposed. With this scheme, crosstalk, in which the right-eye image and the left-eye image become intermixed, occurs during an interval in which one of the right-eye image and the left-eye image is rewritten by the other side; when a viewer sees the image, it is difficult for him or her to clearly recognize that image as a stereoscopic image.

In order to solve this problem, JP-A-2001-54143, for example, discloses a technique in which crosstalk from a left-eye image is corrected in advance when a right-eye image is displayed and crosstalk from a right-eye image is corrected in advance when a left-eye image is displayed.

In the case where liquid crystals are used for a display apparatus that displays an image, the transmissibility of the liquid crystals changes gradually. For this reason, crosstalk cannot be sufficiently suppressed even with the aforementioned correction. Accordingly, JP-A-2009-25436 proposes a technique in which, during the interval in which one of a right-eye image and a left-eye image is rewritten by the other side (or in other words, an interval in which the right-eye image and the left-eye image are intermixed), both a right-eye shutter and a left-eye shutter in stereoscopic eyewear are set to a closed state so that the viewer does not see an image.

However, with the technique disclosed in JP-A-2009-25436, the interval in which the user can actually see the image is limited to the latter halves of the respective right unit interval and left unit interval (that is to say, is limited to be approximately half of the interval). Accordingly, there is a problem in that it is difficult to ensure sufficient brightness in the displayed image.

SUMMARY

It is an advantage of some aspects of the invention to improve the brightness of a displayed image while suppressing a user from sensing the intermixing of a right-eye image and a left-eye image.

An electro-optical device according to an aspect of the invention is used with stereoscopic eyewear that includes a right-eye shutter and a left-eye shutter, and sequentially displays a right-eye image and a left-eye image in each of frames configured of a plurality of fields. The electro-optical device includes: a display unit that displays an image using an electro-optical element; a first correction image data generation unit that generates first correction image data in which a response characteristic of the electro-optical element is corrected based on first image data of a frame and second image data of a frame that is one frame previous to the frame of the first image data; a second correction image data generation unit that generates, based on the first image data and the second image data, second correction image data that corrects crosstalk caused by the right-eye image and the left-eye image intermixing; a selection unit that, of the plurality of fields that configure the frame, selects the first correction image data in the first field and selects the second correction image data in the second and subsequent fields; a correction unit that generates output image data by correcting the first image data using the data outputted from the selection unit and supplies the output image data to the display unit; and a control unit that generates a control signal that controls the opening and closing of the right-eye shutter and the left-eye shutter.

According to this aspect of the invention, a certain degree of luminosity can be ensured by using the first correction image data, and crosstalk can be suppressed by using the second correction image data. As a result, it is possible to improve the brightness of a displayed image while also suppressing a user from sensing the intermixing of the right-eye image and the left-eye image.

Furthermore, because the first correction image data generation unit and the second correction image data generation unit are provided independent from each other, it is only necessary to redesign the second correction image data generation unit if the characteristics of the right-eye shutter and the left-eye shutter have changed; this makes it possible to improve the freedom of design.

According to another aspect of the invention, it is preferable for the first correction image data generation unit to include a first correction table that stores the first image data and the second image data in association with the first correction image data, and for the first correction image data generation unit to read out the first correction image data associated with the first image data and the second image data by referring to the first correction table so that, in the case where the first correction image data has been supplied to the display unit from the beginning of the first field, an optical characteristic of the electro-optical element takes on a value corresponding to a gradation expressed by the first image data at the point in time when the first field has ended.

According to this aspect of the invention, the first correction image data is generated using a table, which enables high-speed response. Furthermore, it is possible to carry out corrections so that the optical characteristic of the electro-optical element takes on a value that corresponds to the gradation expressed by the first image data at the point in time when the first field has ended. In particular, in the case where the right-eye shutter and the left-eye shutter are both in the closed state during the first field, the gradation is controlled to take on an appropriate value while the shutters are in the closed state, and thus it is possible to ensure a sufficient degree of luminosity.

According to another aspect of the invention, in the electro-optical device described above, it is preferable for the first correction image data generation unit to generate the first correction image data by executing a computation that uses the first image data and the second image data as parameters so that, in the case where the first correction image data has been supplied to the display unit from the beginning of the first field, an optical characteristic of the electro-optical element takes on a value corresponding to a gradation expressed by the first image data at the point in time when the first field has ended. In this case, the first correction image data can be generated through a computation.

According to another aspect of the invention, it is preferable for the second correction image data generation unit to include a second correction table that stores the first image data and the second image data in association with the second correction image data, and for the second correction image data generation unit to read out the second correction image data associated with the first image data and the second image data by referring to the second correction table so that, in the case where the second correction image data has been supplied to the display unit from the beginning of the second field, when an image displayed by the display unit is viewed through one of the right-eye shutter and the left-eye shutter, the image component that is to be viewed through the other shutter is at a minimum.

According to this aspect of the invention, the second correction image data is generated using a table, which enables high-speed response. Furthermore, the second correction table, in which is stored the second correction image data, is provided so that the image component that is to be viewed through the other shutter is at a minimum, and it is thus possible to reduce crosstalk.

Furthermore, according to another aspect of the invention, it is preferable for the second correction table to include a plurality of individual correction tables; and for the second correction image data generation unit to select, from among the plurality of individual correction tables, a single individual correction table selected based on the type of the stereoscopic eyewear, and generate the second correction image data using the selected individual correction table. In this case, it is possible to ensure compliance with a plurality of types of stereoscopic eyewear.

In addition, according to another aspect of the invention, it is preferable for the stereoscopic eyewear to output an identification signal indicating the type of the stereoscopic eyewear; and for the second correction image data generation unit to select one of the individual correction tables from among the plurality of individual correction tables in accordance with the identification signal. In this case, an individual correction table can be selected automatically.

According to another aspect of the invention, in the electro-optical device described above, it is preferable for the second correction image data generation unit to generate the second correction image data by executing a computation that uses the first image data and the second image data as parameters so that, in the case where the second correction image data has been supplied to the display unit from the beginning of the second field, when an image displayed by the display unit is viewed through one of the right-eye shutter and the left-eye shutter, the image component that is to be viewed through the other shutter is at a minimum. In this case, the second correction image data can be generated through a computation.

Furthermore, according to another aspect of the invention, it is preferable for the second correction image data generation unit to obtain information regarding response characteristics of the right-eye shutter and the left-eye shutter from the stereoscopic eyewear, and generate the second correction image data by executing a computation that uses the obtained information, the first image data, and the second image data as parameters. In this case, the general applicability of the apparatus can be even further improved. In particular, even if stereoscopic eyewear having improved performance is developed at a later date, the second correction image data can be generated in compliance therewith.

It is preferable that the electro-optical devices according to the aforementioned aspects of the invention be employed as displays in various types of electronic apparatuses.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Embodiment

Figure 1:
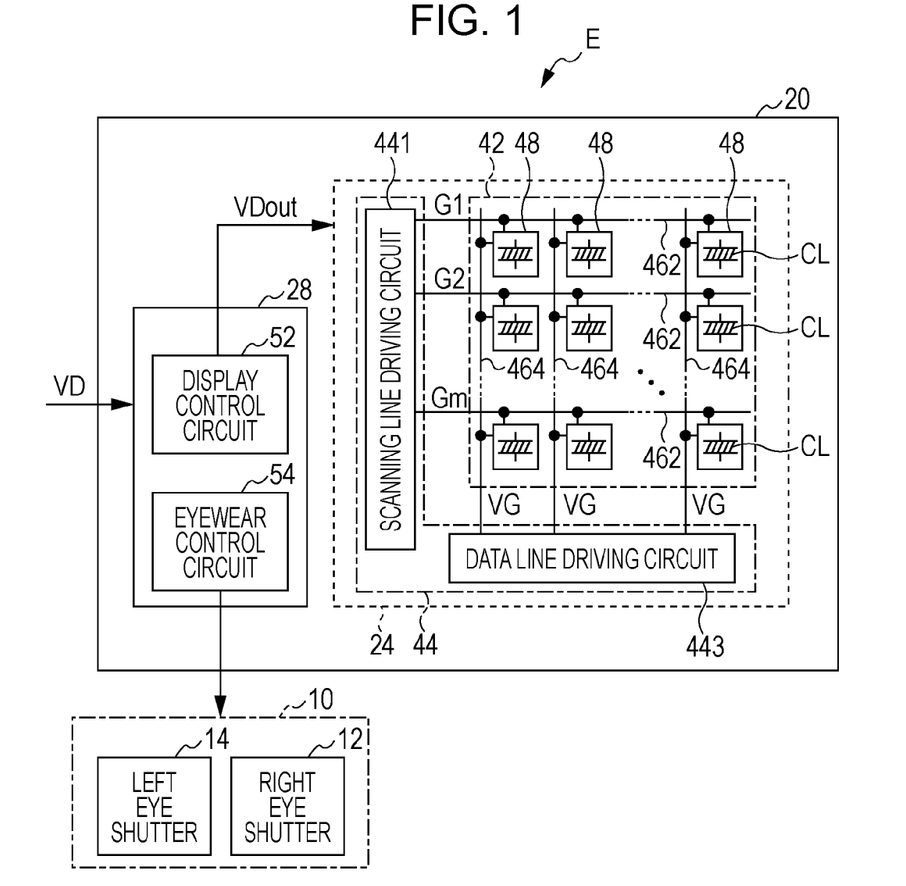
FIG. 1 is a diagram illustrating the configuration of an electronic apparatus according to a first embodiment of the invention.

FIG. 1 is a block diagram illustrating an electronic apparatus E according to a first embodiment of the invention. The electronic apparatus E displays stereoscopic images, which are sensed stereoscopically by a viewer, using a frame-sequential scheme. As shown in FIG. 1, the electronic apparatus E includes stereoscopic eyewear 10 and an electro-optical device 20.

The stereoscopic eyewear 10 shown in FIG. 1 is an eyeglass-shaped implement donned by a viewer when viewing stereoscopic images displayed by the electro-optical device 20, and is configured so as to include a right-eye shutter 12 located in front of the right eye of the viewer and a left-eye shutter 14 located in front of the left eye of the viewer. The right-eye shutter 12 and the left-eye shutter 14 are controlled so as to take on an open state that allows emitted light to pass through and a closed state that blocks emitted light. For example, liquid-crystal shutters that change from the open state to the closed state and vice versa depending on the orientation of liquid crystals controlled by applied voltages can be employed as the right-eye shutter 12 and the left-eye shutter 14.

The electro-optical device 20 in FIG. 1 includes an electro-optical panel 24 and a control circuit 28. The electro-optical panel 24 includes a pixel portion 42 in which a plurality of pixel circuits 48 are arranged and a driving circuit 44 that drives the respective pixel circuits 48. M scanning lines 462 and N data lines 464 that intersect with each other are formed in the pixel portion 42 (M and N are natural numbers). The pixel circuits 48 are disposed with M rows arranged vertically and N columns arranged horizontally, with each pixel circuit 48 located in a position corresponding to where a scanning line 462 and a data line 464 intersect.

The driving circuit 44 is configured so as to include a scanning line driving circuit 441 that sequentially selects the scanning lines 462 by outputting scanning signals G1 to Gm to the scanning lines 462, and a data line driving circuit 443 that supplies a gradation potential VG to the respective N data lines 464 in synchronization with the selection of the scanning lines 462. The gradation potential VG is set to be variable in accordance with a gradation (in other words, the respective pixel values in a displayed image) instructed by an image signal VID supplied from an external circuit, and the polarity thereof relative to a predetermined reference potential inverts in a cyclical manner.

Figure 2:
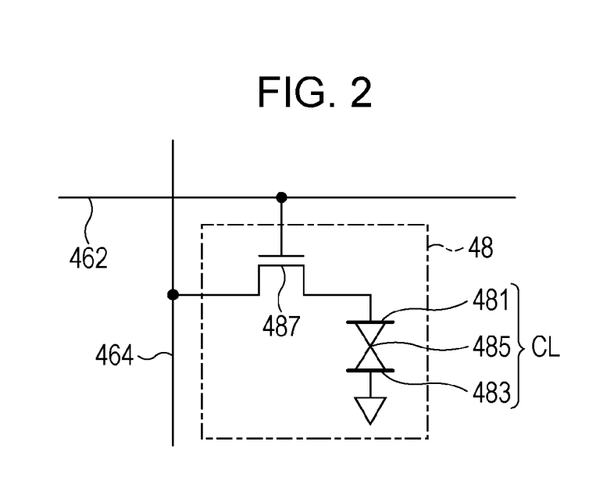
FIG. 2 is a diagram illustrating an example of the configuration of a pixel circuit according to the invention.

FIG. 2 is a circuit diagram illustrating a pixel circuit 48. As shown in FIG. 2, each pixel circuit 48 is configured so as to include a liquid-crystal element CL and a selection switch 487. The liquid-crystal element CL is an electro-optical element configured of a pixel electrode 481 and a common electrode 483 that oppose each other, and a liquid-crystal 485 disposed between the two electrodes. The transmissibility of the liquid-crystal 485 changes in accordance with a voltage applied between the pixel electrode 481 and the common electrode 483.

The selection switch 487 is configured of an N-channel thin-film transistor whose gate is connected to the scanning line 462, is interposed between the liquid-crystal element CL and the data line 464, and controls the electrical connection (conductive/nonconductive) between the two. Accordingly, the pixel circuit 48 (liquid-crystal element CL) displays a gradation based on the potential (gradation potential VG) of the data line 464 when the selection switch 487 has been controlled to go on. Note that an auxiliary capacitor and the like connected to the liquid-crystal element CL in parallel are not shown in this diagram.

In this manner, according to this embodiment, the liquid-crystal element CL is employed as an example of an electro-optical element whose optical characteristics change depending on the electrical energy. It should be noted that the electro-optical element may be a selfluminous element such as an organic EL element or the like.

The control circuit 28 shown in FIG. 1 is configured so as to include a display control circuit 52 that controls the electro-optical panel 24 and an eyewear control circuit 54 that controls the stereoscopic eyewear 10. Note that it is also possible to employ a configuration in which the display control circuit 52 and the eyewear control circuit 54 are provided as a single integrated circuit, as well as a configuration in which the display control circuit 52 and the eyewear control circuit 54 are provided on separate integrated circuits.

Figure 3:
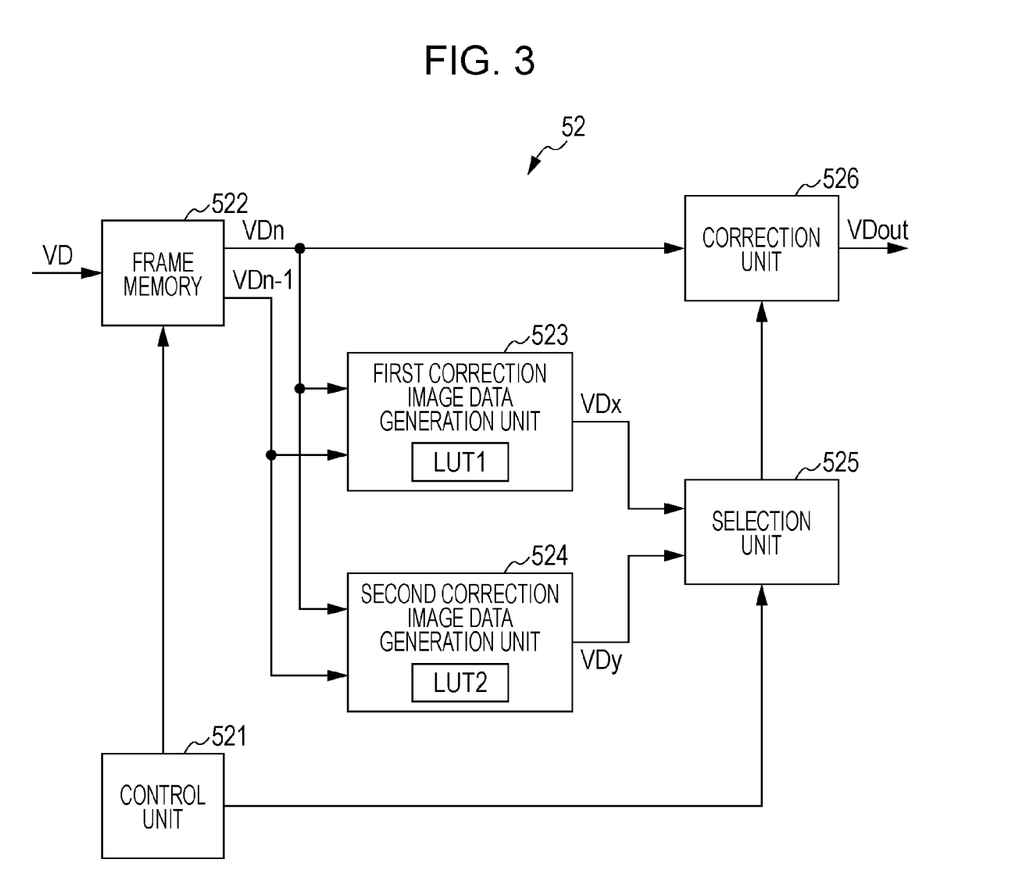
FIG. 3 is a block diagram illustrating the configuration of a display control circuit.

FIG. 3 is a block diagram illustrating the display control circuit 52. The display control circuit 52 includes a frame memory 522 that stores image data VD supplied from an external apparatus. This frame memory 522 is capable of storing at least two frames' worth of the image data VD. Meanwhile, the image data VD supplied from the external apparatus is data in which a single right-eye image or a single left-eye image can be displayed by a single frame. Accordingly, the frame memory 522 can store at least one each of a right-eye image and a left-eye image. In this embodiment, the image data VD of the right-eye image or the left-eye image for a single frame interval is stored in the frame memory 522. The electro-optical panel 24 displays three images in a single frame interval. The interval in which a single image is displayed in the electro-optical panel 24 is referred to as a "field". In other words, a single frame is configured of three fields; in a right-eye frame, a right-eye image is displayed in each field, whereas in a left-eye frame, a left-eye image is displayed in each field.

In addition, assuming that the image data in the n-th frame is first image data VDn and the image data in the frame that is one frame previous to the n-th frame is second image data VDn−1, the frame memory 522 reads out the first image data VDn and the second image data VDn−1 simultaneously. The first image data VDn is supplied to a correction unit 526, a first correction image data generation unit 523, and a second correction image data generation unit 524.

The first correction image data generation unit 523 includes a first correction table LUT 1, and generates first correction image data VDx. The first correction table LUT 1 stores the first image data VDn and the second image data VDn−1 in association with the first correction image data VDx. The first correction image data VDx is used to correct the response characteristics of the liquid-crystals used in the electro-optical panel 24.

The second correction image data generation unit 524 includes a second correction table LUT 2, and generates second correction image data VDy. The second correction table LUT 2 stores the first image data VDn and the second image data VDn−1 in association with the second correction image data VDy. The second correction image data VDy is used to suppress crosstalk.

Figure 4:
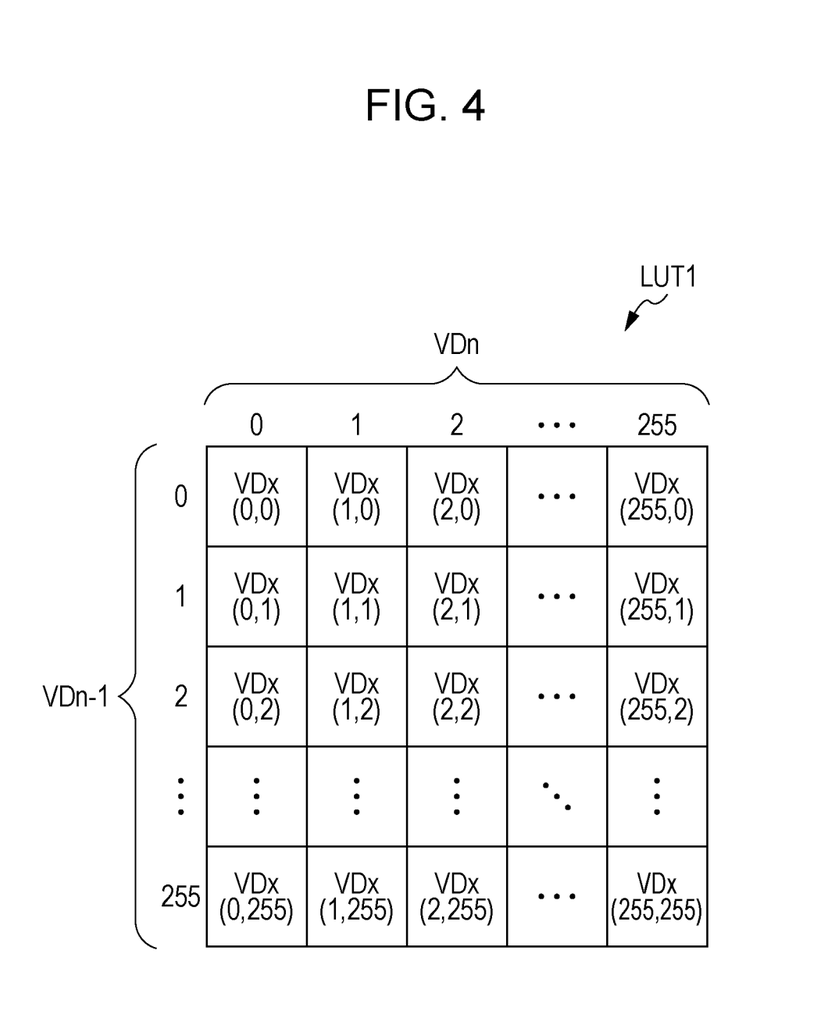
FIG. 4 is a descriptive diagram illustrating the data structure of a first correction table.

For example, in the case where the first image data VDn and the second image data VDn−1 are each given eight bits, there are 256×256 possible combinations for the values thereof. The data structure of the first correction table LUT 1 has, as shown in FIG. 4, first correction image data VDx (0,0), VDx (1,0), and so on up to VDx (255,255) stored in 256×256 storage regions specified by the first image data VDn and the second image data VDn−1. Note that the data structure for the second correction table LUT 2 is the same.

Under the control of a control unit 521, a selection unit 525 selects the first correction image data VDx in the first field of the first frame, selects the second correction image data VDy in the second and third fields of the first frame, and supplies the data to the correction unit 526.

The correction unit 526 corrects the first image data VDn using the data outputted from the selection unit 525 in order to generate output image data VDout, and supplies the output image data VDout to the electro-optical panel 24. The correction unit 526 generates the output image data VDout by, for example, adding the data outputted from the selection unit 525 to the first image data VDn. Alternatively, the output image data VDout may be generated by subtracting the data outputted from the selection unit 525 from the first image data VDn. Further still, the output image data VDout may be generated by the correction unit 526 combining addition, subtraction, multiplication, and division as appropriate.

Figure 5:
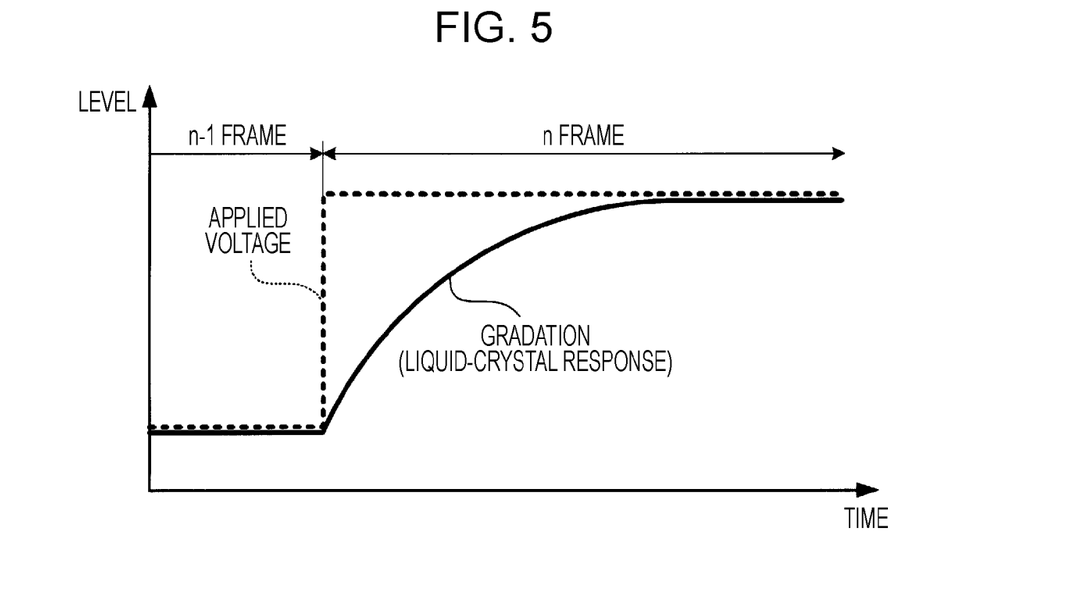
FIG. 5 is a descriptive diagram illustrating liquid crystal response characteristics of an electro-optical panel.

As described above, the first correction image data VDx plays a role for correcting the response characteristics of the liquid-crystals used in the electro-optical panel 24. For example, in the case where the voltage applied to the liquid-crystals has changed stepwise as indicated by the dotted line in FIG. 5, the transmissibility of the liquid-crystals gradually changes so as to approach a target value (normally, this is a luminosity that is to be displayed). The screen will become dark if it takes a long amount of time for the transmissibility of the liquid-crystals to approach the target value.

Figure 6:
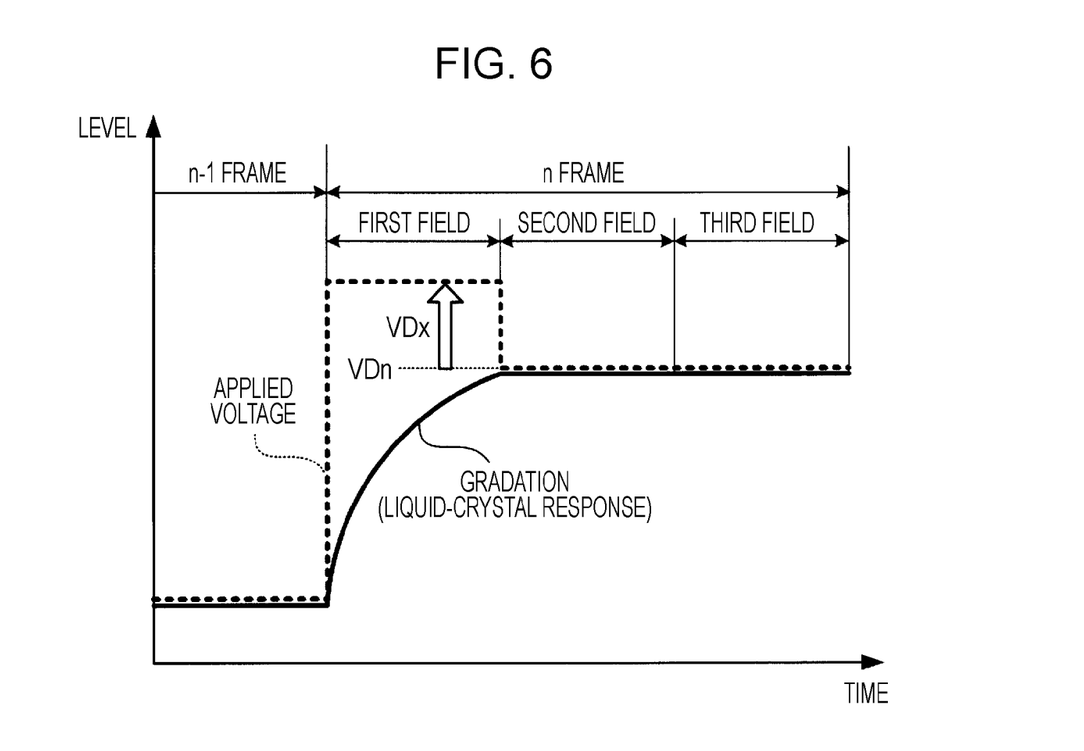
FIG. 6 is a descriptive diagram illustrating first correction image data.

In this embodiment, a value is determined for the first correction image data VDx so that at the point in time when the first field ends, the transmissibility of the liquid-crystals corresponds to the luminosity that is to be displayed. As mentioned above, the first correction image data VDx is selected in the first field, and therefore the output image data VDout is equivalent to VDn+VDx; as a result, the voltage applied to and the transmissibility of the liquid-crystals changes as illustrated in FIG. 6.

Furthermore, in this embodiment, the right-eye shutter 12 and the left-eye shutter 14 are both in the closed state in the first field of each frame in order to suppress crosstalk. As mentioned above, the second correction image data VDy is used to suppress crosstalk. Crosstalk is related to the response characteristics of the liquid-crystals in the electro-optical panel 24, as well as to the response characteristics of the right-eye shutter 12 and the left-eye shutter 14.

Figure 7:
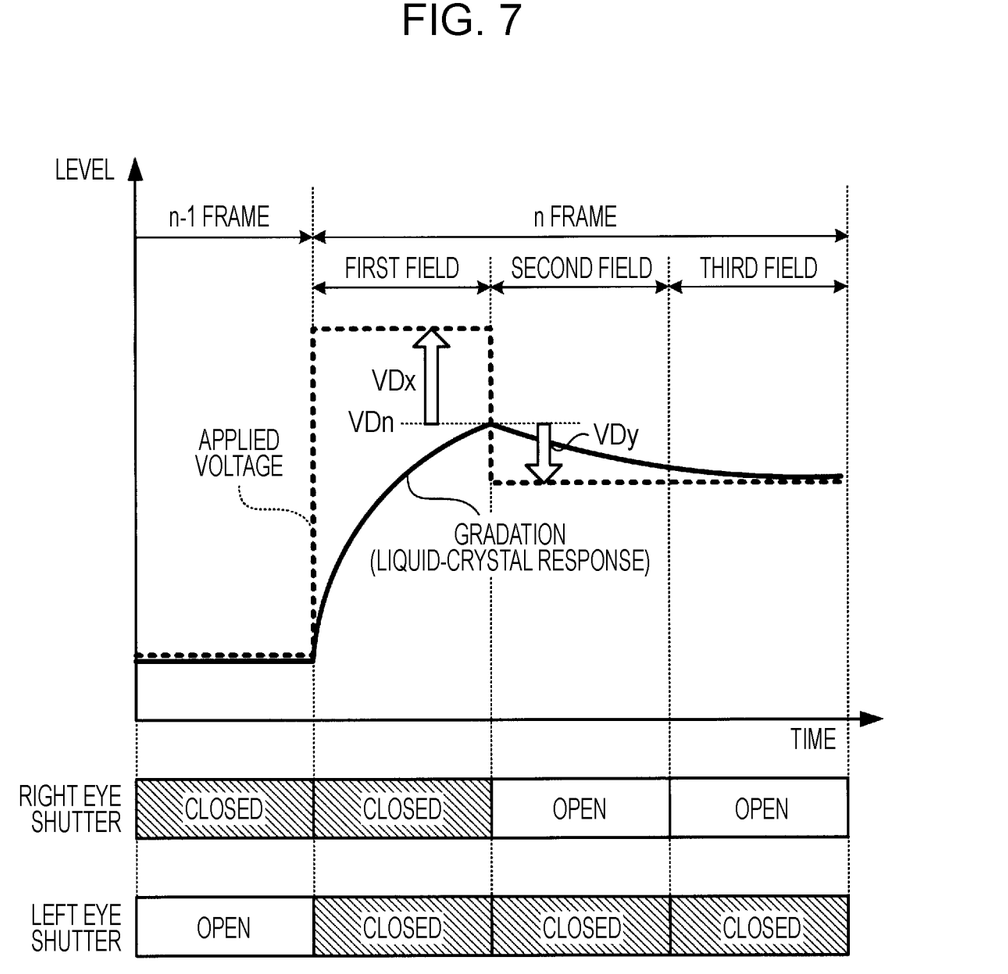
FIG. 7 is a descriptive diagram illustrating second correction image data.

With the electro-optical panel 24, image signals are written in a line-sequential manner. Here, as shown in FIG. 7, the right-eye shutter 12 is in the closed state in the first field of the n-th frame in which the right-eye image is displayed. However, at the point in time when the first field ends, the liquid-crystals are not responding sufficiently in the line that is written last. Accordingly, even if the right-eye shutter 12 is in the open state in the second field, the gradation will not change sufficiently from the left-eye image to the right-eye image. In this manner, the response characteristics of the electro-optical panel 24 have an influence on the crosstalk.

Furthermore, although the right-eye shutter 12 is in the open state in the second field, the shutter is configured using liquid-crystals, and thus instead of reaching the maximum transmissibility immediately after the second field has started, the transmissibility of the shutter increases in a gradual manner. Likewise, although the left-eye shutter 14 is in the closed state in the second field, the minimum transmissibility is not 0%, and therefore a luminosity, corresponding to the right-eye image, that is equivalent to the minimum transmissibility passes through the left-eye shutter 14. Thus the dynamic and static response characteristics of the shutters also have an influence on the crosstalk.

In the case where the second correction image data VDy is supplied to the electro-optical panel 24 from the start of the second field, the configuration is such that if the image displayed on the electro-optical panel 24 is viewed through one of the right-eye shutter 12 and the left-eye shutter 14, the image component that is to be seen through the other shutter is at a minimum. To be more specific, the second correction image data VDy is determined by changing only the values that can be taken on by the first image data VDn and the second image data VDn−1 so that the image component that is to be seen through the other shutter is at a minimum, and the second correction image data VDy is stored in the second correction table LUT 2 in correspondence with the first image data VDn and the second image data VDn−1.

As described above, the selection unit 525 outputs the second correction image data VDy from the second field on. Accordingly, the output image data VDout is equivalent to VDn+VDy from the second field on, as shown in FIG. 7. Note, however, that VDy is a negative value in the example shown in FIG. 7.

In this manner, according to this embodiment, a certain luminosity is secured by the first correction image data VDx, whereas crosstalk is suppressed by the second correction image data VDy. As a result, it is possible to improve the brightness of a displayed image while also suppressing a user from sensing the intermixing of the right-eye image and the left-eye image.

In addition, the first correction image data generation unit 523 and the second correction image data generation unit 524 are provided independent from each other. Furthermore, as described above, the first correction image data VDx is set in accordance with the unique liquid-crystal characteristics of the electro-optical panel 24. However, it is necessary to determine the second correction image data VDy taking into consideration the dynamic and static response characteristics of the right-eye shutter 12 and the left-eye shutter 14. Accordingly, it is only necessary to change the second correction image data generation unit 524 in the case where a different type of stereoscopic eyewear 10 is used. Specifically, it is possible to ensure compliance with a different type of stereoscopic eyewear 10 simply by changing the second correction table LUT 2. As a result, it is possible to configure the electronic apparatus E with a high degree of freedom.

2. Second Embodiment

Figure 8:
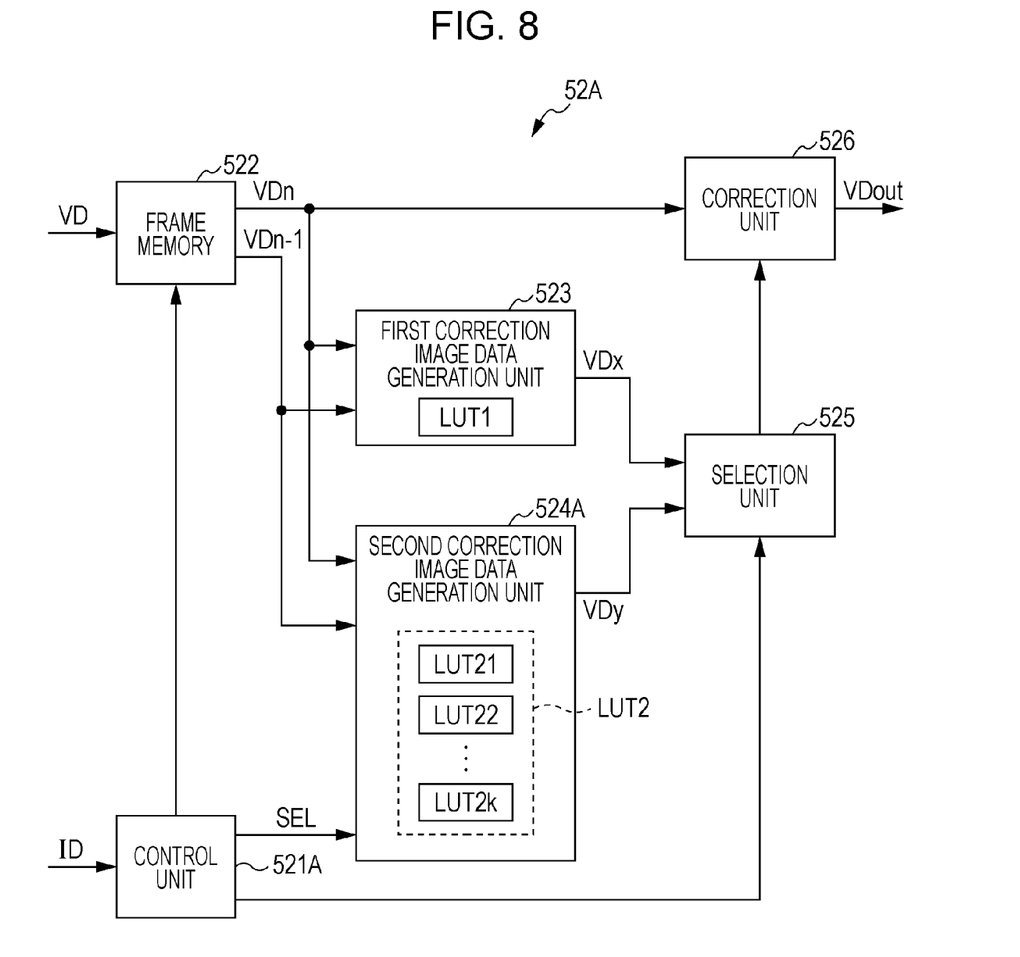
FIG. 8 is a block diagram illustrating a display control circuit according to a second embodiment.

In the aforementioned first embodiment, the second correction image data generation unit 524 is compliant with a single type of stereoscopic eyewear 10. As opposed to this, the electronic apparatus E according to the second embodiment is compliant with a plurality of types of stereoscopic eyewear 10, and aside from the display control circuit 52 being replaced with a display control circuit 52A as shown in FIG. 8, has the same configuration as the electronic apparatus E according to the first embodiment.

In the display control circuit 52A, the second correction table LUT 2 includes k (where k is an integer of 2 or more) individual correction tables LUT 21, LUT 22, and so on up to LUT 2k. The k second correction tables LUT 21, LUT 22, and so on up to LUT 2k correspond to each of k types of stereoscopic eyewear 10. An identification signal ID that identifies the type of the stereoscopic eyewear 10 is sent from the stereoscopic eyewear 10. A control unit 521A generates a selection signal SEL based on the identification signal ID.

A second correction image data generation unit 524A selects one of the k individual correction tables LUT 21, LUT 22, and so on up to LUT 2k based on the selection signal SEL supplied from the control unit 521A, and generates the second correction image data VDy using the selected individual correction table. Note that the control unit 521A may output the identification signal ID as the selection signal SEL. In sum, any method may be used as long as the second correction image data generation unit 524A can select a single corresponding individual correction table from among the plurality of individual correction tables LUT 21 to LUT 2k in accordance with the identification signal ID.

In this manner, according to the second embodiment, even if the type of the stereoscopic eyewear 10 is changed, the second correction image data VDy corresponding to that stereoscopic eyewear 10 can be generated. As a result, it is possible to configure the electronic apparatus E with an even higher degree of freedom.

3. Third Embodiment

In the aforementioned first embodiment, the second correction image data generation unit 524 includes the second correction table LUT 2, which corresponds to a certain temperature. As opposed to this, an electronic apparatus E according to the third embodiment includes individual correction tables LUT 31, LUT 32, and so on up to LUT 3k, which correspond to a plurality of temperatures.

Figure 9:
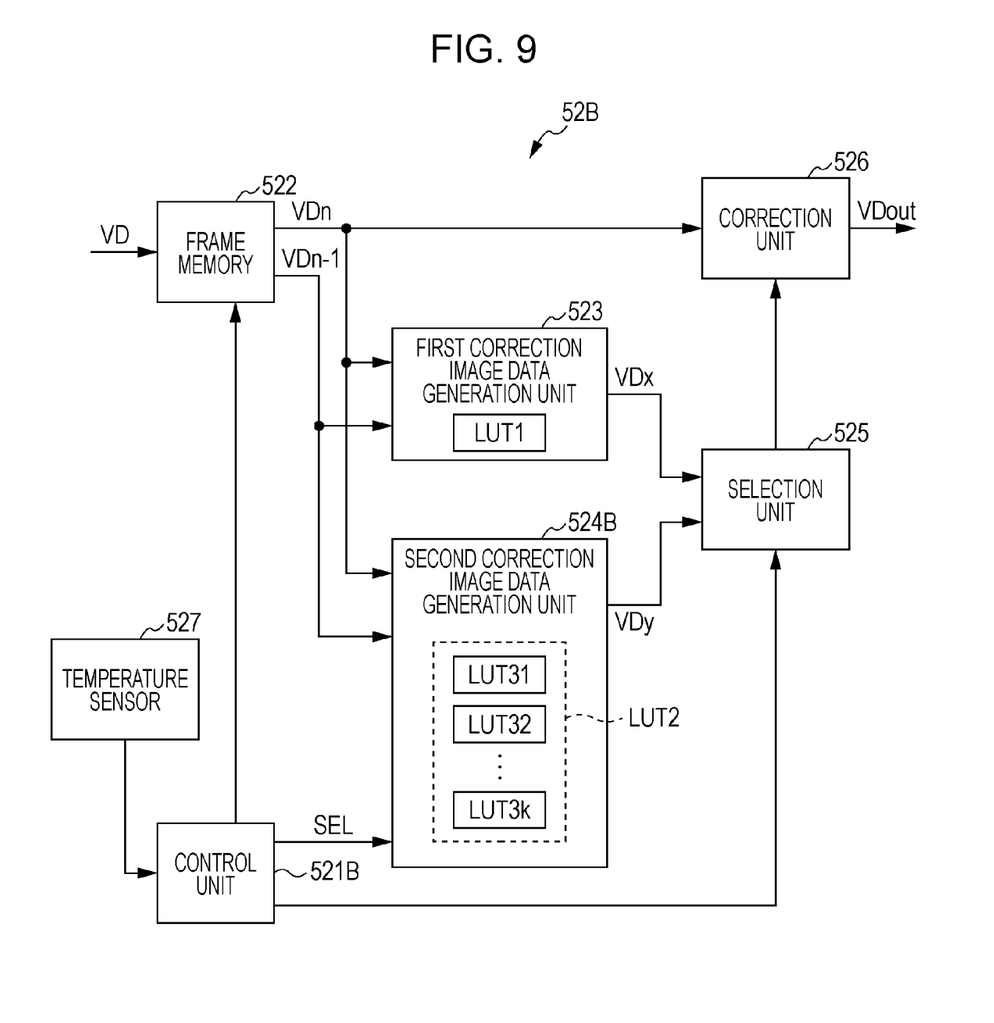
FIG. 9 is a block diagram illustrating a display control circuit according to a third embodiment.

FIG. 9 illustrates a display control circuit 52B according to the third embodiment. In the display control circuit 52B, the second correction table LUT 2 includes k (where k is an integer of 2 or more) individual correction tables LUT 31, LUT 32, and so on up to LUT 3k. The k individual correction tables LUT 31, LUT 32, and so on up to LUT 3k correspond to each of k types of temperatures.

A temperature sensor 527 detects a temperature and supplies a temperature signal indicating the detected temperature to a control unit 521B. The control unit 521B then generates a selection signal SEL specifying which of the individual correction tables LUT 31, LUT 32, and so on up to LUT 3k is to be selected based on the temperature signal.

A second correction image data generation unit 524B selects one of the k individual correction tables LUT 31, LUT 32, and so on up to LUT 3k based on the selection signal SEL supplied from the control unit 521B, and generates the second correction image data VDy using the selected individual correction table.

Note that the temperature signal may be supplied to the second correction image data generation unit 524B, and the second correction image data generation unit 524B may select two individual correction tables that are near the temperature indicated by the temperature signal, after which the second correction image data VDy may be generated by executing an interpolation process based on the temperatures.

In this manner, according to the third embodiment, even if the temperature changes, the second correction image data VDy corresponding to that temperature can be generated. Through this, it is possible to display a high-quality image even if the temperature changes.

4. Variations

Many variations can be made on the aforementioned embodiments. Examples of specific variations will be described hereinafter. Note that two or more variations may be selected as desired from the examples given below and combined as appropriate.

(1) Although the first correction image data VDx is generated using the first correction table LUT 1 in the aforementioned embodiments, the invention is not limited thereto, and the first correction image data VDx may be generated through a computation. In the first correction image data generation unit 523, the first correction image data VDx is thus generated by executing a computation that uses the first image data VDn and the second image data VDn−1 as parameters, so that, in the case where the first correction image data VDx has been supplied to the electro-optical panel 24 from the beginning of the first field, the optical characteristics of the liquid-crystals at the point in time when the first field has ended take on a value that corresponds to the gradation expressed by the first image data VDn. It is preferable for this computation to include a constant that corresponds to the response characteristics of the liquid-crystals.

(2) Although the second correction image data VDy is generated using the second correction table LUT 2 (LUT 21 to LUT 2k) in the aforementioned embodiments, the invention is not limited thereto, and the second correction image data VDy may be generated through a computation. The second correction image data generation unit 524 (524A) generates the second correction image data VDy by executing a computation that uses the first image data VDn and the second image data VDn−1 as parameters, so that, in the case where the second correction image data VDy has been supplied to the electro-optical panel 24 from the beginning of the second field, when the image displayed by the electro-optical panel 24 is viewed through one of the right-eye shutter 12 and the left-eye shutter 14, the image component that is to be viewed through the other shutter is at a minimum. In this computation, it is preferable for at least one of the response characteristics of the liquid-crystals in the electro-optical panel 24 and the minimum transmissibility, response characteristics such as response delay, and so on of the right-eye shutter 12 and the left-eye shutter 14 to be included as a constant.

Note that in a case of complying with k types of stereoscopic eyewear 10, the aforementioned constants may be used as parameters and switched according to the type of the stereoscopic eyewear 10.

(3) Although the aforementioned embodiments describe a single frame as being configured of three fields, the invention is not limited thereto, and any configuration may be used as long as a single frame is configured of two or more fields. In this case, too, the first correction image data VDx is selected in the first field, and the second correction image data VDy is selected in the second and following fields.

(4) Although the aforementioned embodiments describe one of the right-eye shutter 12 and the left-eye shutter 14 as changing from the closed state to the open state at the border between the first field and the second field, the invention is not limited thereto, and there may be a certain amount of skew. For example, the change from the closed state to the open state may occur at any timing as long as it is within an interval spanning from the latter half of the first field to the former half of the second field.

(5) Although the aforementioned second embodiment describes switching the individual correction tables LUT 21 to LUT 2k upon receiving the identification signal ID from the stereoscopic eyewear 10, the invention is not limited thereto, and the identification signal ID need not be received. In this case, the individual correction tables LUT 21 to LUT 2k may be selected using a toggle switch that can be manipulated by the user (for example, a remote controller).

In addition, the identification signal ID may be any information that enables the type of the stereoscopic eyewear 10 to be identified, and may therefore be information expressing the minimum transmissibility, response characteristics such as the delay characteristics, and so on of the right-eye shutter 12 and the left-eye shutter 14 as numerical values. In this case, the control unit 521A may generate a selection signal SEL specifying the individual correction table based on the stated information.

Furthermore, the second correction image data generation unit may obtain information regarding the response characteristics of the right-eye shutter 12 and the left-eye shutter 14 from the stereoscopic eyewear, and may then generate the second correction image data VDy by executing a computation that uses the obtained information, the first image data VDn, and the second image data VDn−1 as parameters. In this case, even if stereoscopic eyewear 10 having improved performance is developed at a later date, the second correction image data VDy can be generated in compliance therewith.

5. Application Examples

The electro-optical device 20 describe as an example in the aforementioned embodiments can be used in various types of electronic apparatuses.

Figure 10:
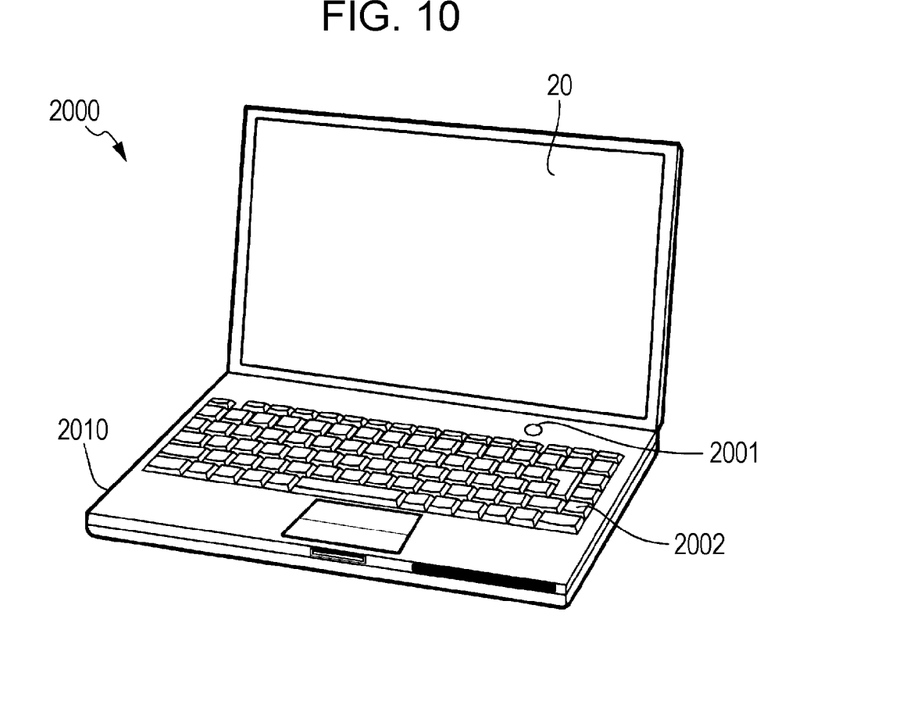
FIG. 10 is a diagram illustrating an example of an electronic apparatus in which an electro-optical device is used.

FIG. 10 is a perspective view illustrating a mobile personal computer that employs the electro-optical device 20. A personal computer 2000 includes the electro-optical device 20, which displays various types of images, and a main body unit 2010 in which are provided a power switch 2001, a keyboard 2002, and so on. This personal computer 2000 is capable of stereoscopic display by using the stereoscopic eyewear 10, which is not shown in FIG. 10.

Figure 11:
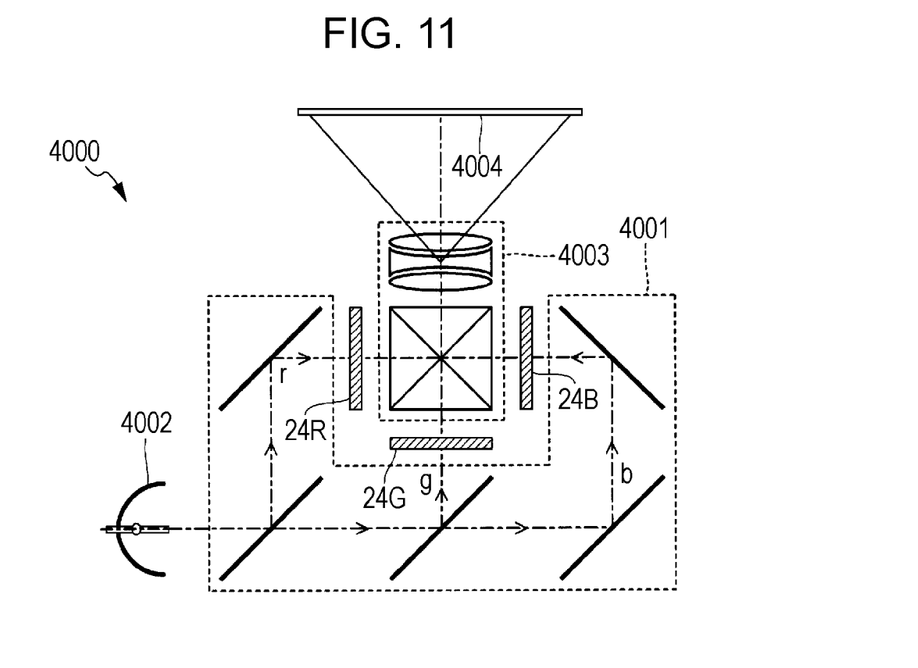
FIG. 11 is a diagram illustrating an example of an electronic apparatus in which an electro-optical device is used.

FIG. 11 is a schematic diagram illustrating a projection-type display apparatus (a three-panel projector) 4000 in which the electro-optical device 20 is applied. The projection-type display apparatus 4000 is configured so as to include three electro-optical panels 24 (24R, 24G, and 24B) that correspond to respective different display colors (red, green, and blue), and a control circuit (not shown). An illuminative optical system 4001 supplies, of light emitted from an illumination apparatus (light source) 4002, a red component r to the electro-optical panel 24R, a green component g to the electro-optical panel 24G, and a blue component b to the electro-optical panel 24B. Each electro-optical panel 24 functions as a light modulator (light bulb) that modulates the respective colors of light supplied from the illuminative optical system 4001 in accordance with a display image. A projection optical system 4003 combines the light emitted from the respective electro-optical panels 24 and projects the resulting light onto a projection surface 4004. In this case, a display unit according to the invention includes the projection optical system 4003. The second correction image data VDy may be set so that the crosstalk is a minimum in the case where an image projected onto the projection surface 4004 is viewed through the right-eye shutter 12 and the left-eye shutter 14.

Note that in addition to the apparatuses illustrated as examples in FIG. 10 in FIG. 11, the following can be given as examples of electronic apparatuses in which the electro-optical device according to the invention can be applied: PDAs (Personal Digital Assistants); digital still cameras; television; video cameras; car navigation systems; vehicular displays (instrument panels); electronic notepads; e-paper; videophones; POS terminals; video players; apparatuses including touch panels; and so on.

This application claims priority to Japan Patent Application No. 2011-015675 filed Jan. 27, 2011, the entire disclosures of which are hereby incorporated by reference in their entireties.

What is claimed is:

1. An electro-optical device, used with stereoscopic eyewear that includes a right-eye shutter and a left-eye shutter, that sequentially displays a right-eye image and a left-eye image in each of frames configured of a plurality of fields, the device comprising:
    a display unit that displays an image data using an electro-optical element;
    a first correction image data generation unit that generates, based on a first image data of a frame and a second image data of a frame that is one frame previous to the frame of the first image data, a first correction image data that corrects a response characteristic of the electro-optical element;
    a second correction image data generation unit that generates, based on the first image data and the second image data, a second correction image data that corrects a crosstalk caused by the right-eye image and the left-eye image intermixing;
    a selection unit that, selects a first correction image data during a first field of the frame during which the first image data is displayed and selects a second correction image data in a second and subsequent fields of the frame during which the first image data is displayed, wherein the correction unit generates the image data by adding the first correction image data to the first image data in the first field and adding the second correction image data to the first image data in the second field;
    a correction unit that generates the image data by correcting the first image data using the first correction image data or the second correction image data by selecting the selection unit;
    a output unit that supplies the image data to the display unit; and
    a control unit that generates a control signal that controls the opening and closing of the right-eye shutter and the left-eye shutter.

2. The electro-optical device according to claim 1,
wherein the first correction image data generation unit includes a first correction table that stores the first image data and the second image data in association with the first correction image data, and the first correction image data generation unit reads out the first correction image data associated with the first image data and the second image data by referring to the first correction table so that, in the case where the first correction image data has been supplied to the display unit from the beginning of the first field, an optical characteristic of the electro-optical element takes on a value corresponding to a gradation expressed by the first image data at the point in time when the first field has ended.

3. The electro-optical device according to claim 1,
wherein the first correction image data generation unit generates the first correction image data by executing a computation that uses the first image data and the second image data as parameters so that, in the case where the first correction image data has been supplied to the display unit from the beginning of the first field, an optical characteristic of the electro-optical element takes on a value corresponding to a gradation expressed by the first image data at the point in time when the first field has ended.

4. The electro-optical device according to claim 1,
wherein the second correction image data generation unit includes a second correction table that stores the first image data and the second image data in association with the second correction image data, and the second correction image data generation unit reads out the second correction image data associated with the first image data and the second image data by referring to the second correction table so that, in the case where the second correction image data has been supplied to the display unit from the beginning of the second field, when an image displayed by the display unit is viewed through one of the right-eye shutter and the left-eye shutter, the image component that is to be viewed through the other shutter is at a minimum.

5. The electro-optical device according to claim 4,
wherein the second correction table includes a plurality of individual correction tables; and
the second correction image data generation unit selects, from among the plurality of individual correction tables, a single individual correction table selected based on the type of the stereoscopic eyewear, and generates the second correction image data using the selected individual correction table.

6. The electro-optical device according to claim 5,
wherein the stereoscopic eyewear outputs an identification signal indicating the type of the stereoscopic eyewear; and
the second correction image data generation unit selects one of the individual correction tables from among the plurality of individual correction tables in accordance with the identification signal.

7. The electro-optical device according to claim 1,
wherein the second correction image data generation unit generates the second correction image data by executing a computation that uses the first image data and the second image data as parameters so that, in the case where the second correction image data has been supplied to the display unit from the beginning of the second field, when an image displayed by the display unit is viewed through one of the right-eye shutter and the left-eye shutter, the image component that is to be viewed through the other shutter is at a minimum.

8. The electro-optical device according to claim 7,
wherein the second correction image data generation unit obtains information regarding response characteristics of the right-eye shutter and the left-eye shutter from the stereoscopic eyewear, and generates the second correction image data by executing a computation that uses the obtained information, the first image data, and the second image data as parameters.

9. An electronic apparatus comprising the electro-optical device according to claim 1.

10. An electronic apparatus comprising the electro-optical device according to claim 2.

11. An electronic apparatus comprising the electro-optical device according to claim 3.

12. An electronic apparatus comprising the electro-optical device according to claim 4.

13. An electronic apparatus comprising the electro-optical device according to claim 5.

14. An electronic apparatus comprising the electro-optical device according to claim 6.

15. An electronic apparatus comprising the electro-optical device according to claim 7.

16. An electronic apparatus comprising the electro-optical device according to claim 8.

* * * * *